Aug. 2, 1927.

F. M. CASE

FISHING REEL

Filed June 2, 1922

Inventor
Francis M. Case
By Brockett & Hyde
Att'ys

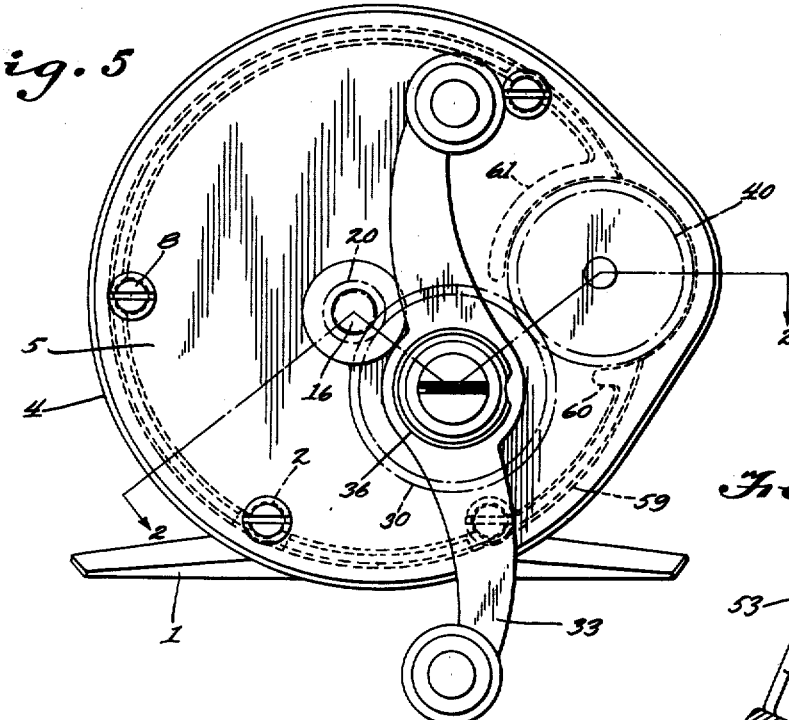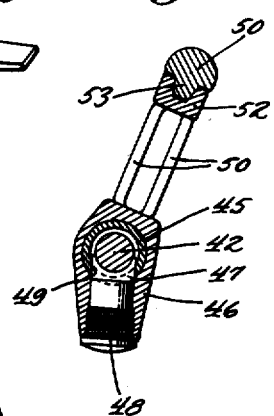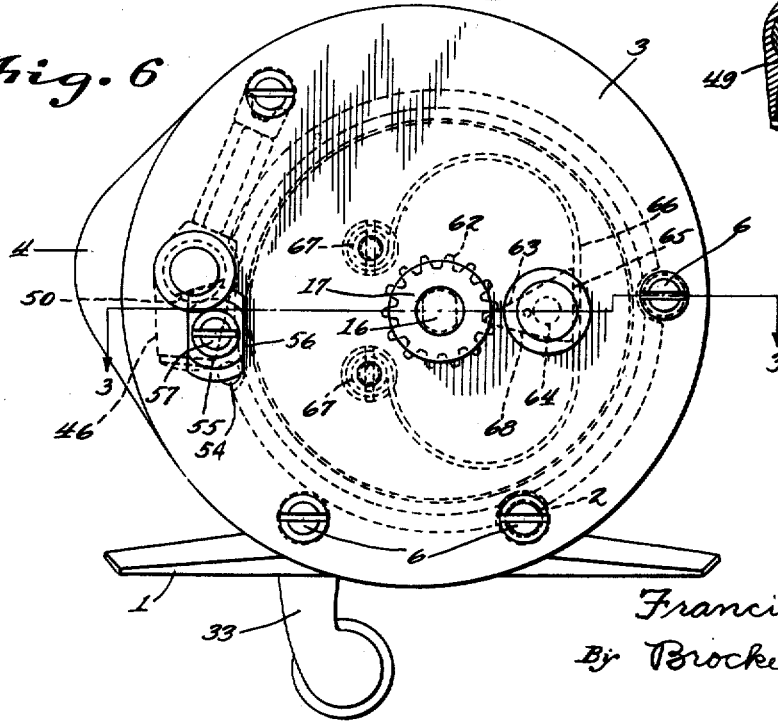

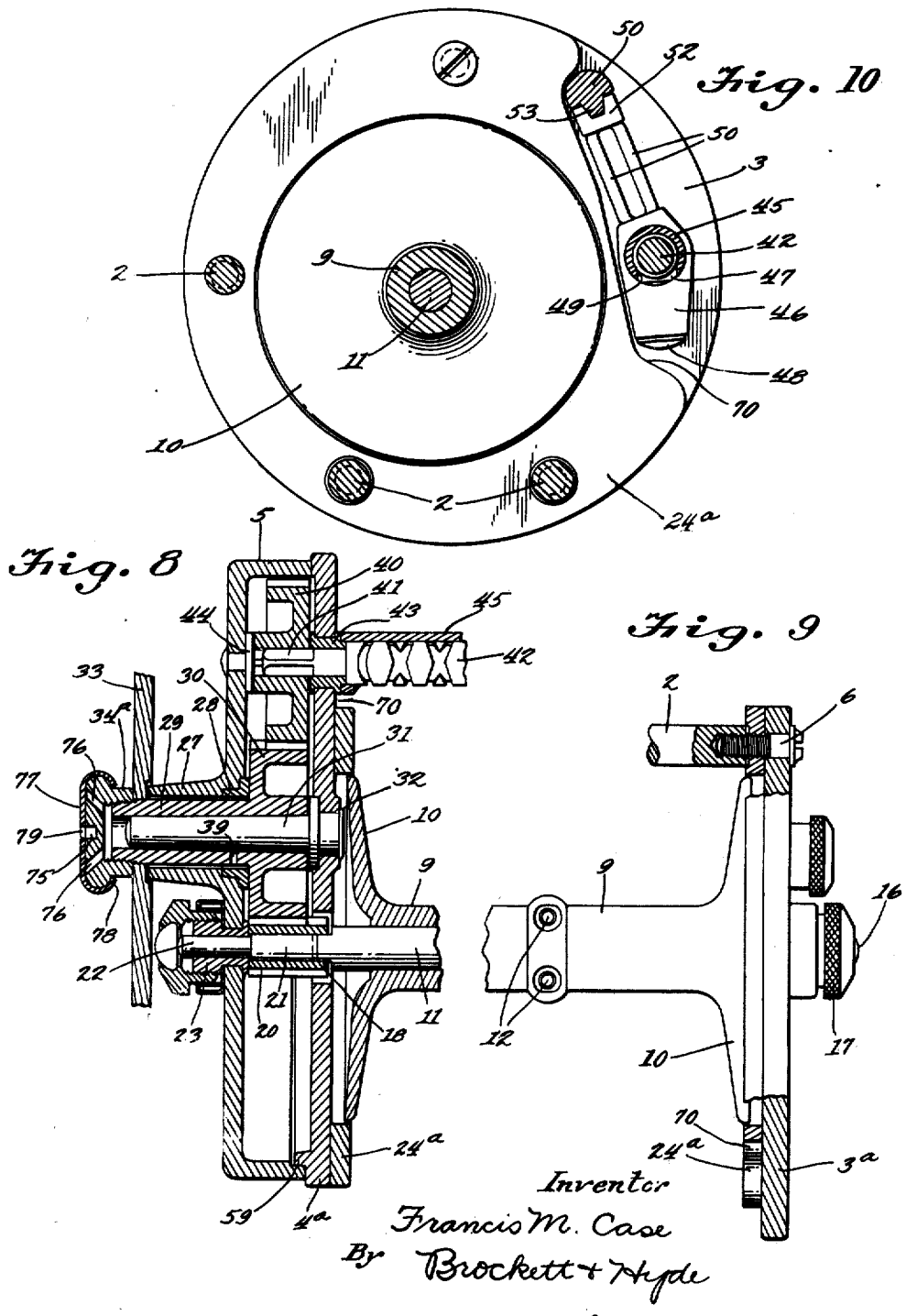

Aug. 2, 1927.
F. M. CASE
1,637,437
FISHING REEL
Filed June 2, 1922    4 Sheets-Sheet 4
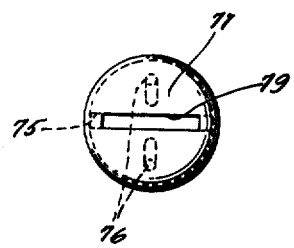
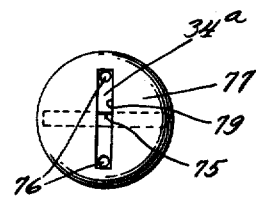
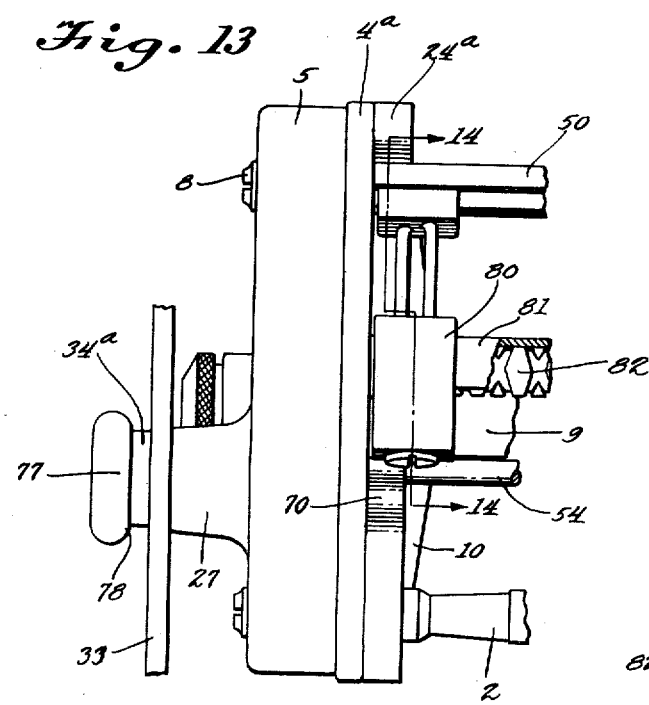
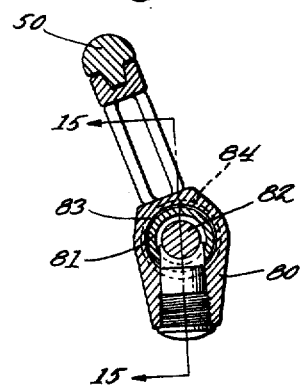
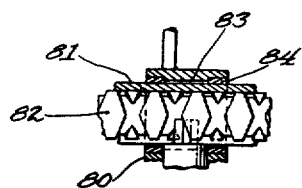
Inventor
Francis M. Case
By Brockett & Hyde
Att'ys Patented Aug. 2, 1927.

1,637,437

UNITED STATES PATENT OFFICE.

FRANCIS M. CASE, OF CLEVELAND HEIGHTS, OHIO, ASSIGNOR TO THE ENTERPRISE MANUFACTURING COMPANY, OF AKRON, OHIO, A CORPORATION OF OHIO.

FISHING REEL.

Application filed June 2, 1922. Serial No. 565,377.

This invention relates to level winding fishing reels.

The object of the invention is generally to improve the construction of the reel frame, including the heads and gear casing, to enable them to be accurately and cheaply made of die castings and at the same time furnish support for and properly confine the shafts and gears.

A further object of the invention is to improve the lubricating devices for the rotating parts and enable lubricant to be readily supplied to the gearing and other mechanism. Still another object of the invention is to provide a reel including a spool having relatively flat end heads, the peripheries of which are protected by overlying flanges of the frame heads, both for the purpose of guiding the line to the spool and preventing it from going beyond the spool heads and also to provide more room for the reciprocating line guide carriage, so that the latter will properly lay the line clear to the spool head up to its full capacity.

A further object of the invention is to provide an improved form of click and tension spring therefor, said click being unbalanced in its two directions of operation so as to not only serve as a click but to also offer more resistance to rotation of the spool in one direction than in the other.

Further objects of the invention are in part obvious and in part will appear more in detail hereinafter.

The invention comprises the construction and arrangement of parts hereinafter described and claimed.

In the drawings, which represent one suitable embodiment of the invention, Fig. 1 is a front elevation, partly broken out and in section; Fig. 2 is a developed sectional view of the gear casing and neighboring end of the spool on approximately the line 2—2, Fig. 5; Fig. 3 is a detail sectional view through the opposite end of the reel on approximately the line 3—3, Fig. 6; Fig. 4 is a detail cross section on the line 4—4, Fig. 3; Fig. 5 is an elevation of the operating or head end of the reel; Fig. 6 is an end elevation of the other or tail end of the reel; Fig. 7 is a detail section on the line 7—7, Fig. 1; Figs. 8 and 9 are views corresponding to Figs. 2 and 3, and illustrating modifications; Fig. 10 is an elevation of the end frame plate shown in Fig. 9, from the left in Fig. 9, with the line guide carriage seated in a recess in said plate; Figs. 11 and 12 are end views of the lubricating cap nut shown in Fig. 8; Fig. 13 is a view corresponding to the left hand end of Fig. 1 and illustrating a modified arrangement of level wind carriage; Fig. 14 is a section on the line 14—14, Fig. 13; and Fig. 15 is a section on the line 15—15, Fig. 14.

The reel shown in the drawings comprises a suitable frame including a foot plate 1 rigidly connected to two of a series of pillars 2 distributed about the spool axis and which connect the end plates or heads 3, 4. To one of these plates 4 is secured a hollow gear casing 5, the securement being effected by the pillars 2, one of which is shown in detail in Fig. 3. Each pillar has one end provided with a threaded opening to receive a headed screw 6 passed through the reel head 3, while the opposite end of said pillar has a reduced portion 7 passing through openings in the reel head 4 and casing 5, said reduced end being also threaded to receive a screw 8.

Between the two heads 3, 4 is located the rotating spool, which comprises a spool member having a sleeve portion 9 and slightly flaring but comparatively flat heads 10 and through which extends a hardened steel shaft 11. Holes 12 are usually provided in a central enlargement of the sleeve for the purpose of securing the line to the spool. One end of the spool shaft is reduced at 13 and rotates in a suitable bearing member 14 suitably attached to the end head 3, as by beading over a flange at 15. End play is received and taken up by the agate or other hardened end bearing member 16 in a threaded cap 17. At its opposite end the shaft 11 is first flattened off on two sides, as at 18, for driving connection in a transverse recess 19 in the end of a small pinion 20, is then reduced to cylindrical form at 21 where the shaft passes through the opening in said pinion, and is again reduced at 22 for support in an end bearing 23 similar to the one at the opposite end of the spool. Both spool end heads 10 partly enter shallow recesses defined by annular ribs on the faces of the spool heads, one rib 24 on head 3 and another rib 25 on head 4. The outer portion of either or both of said ribs may be tapered, as at 26, to more readily guide the line to and over the spool head. This arrangement puts the body portions of the plates 3, 4 endwise beyond the spool heads, so that the level wind carriage, later to be described, is allowed greater overall movement lengthwise of the spool and will properly lay the line clear to the spool heads until the spool is entirely filled.

Casing 5 is preferably provided with an outwardly extending tubular boss 27 in which is a hardened steel bushing 28 and through which bushing and boss projects a hollow or sleeve like extension 29 from the main driving gear 30, said gear being rotatably mounted upon a stub shaft 31 suitably secured to the end head 4, as by beading over a flange at 32. A driving handle 33 is preferably secured to a squared portion of the sleeve 29 by a hollow cap nut 34 in which is an annular recess 35 receiving a rotatable ring 36 having a port 37 adapted to be brought into registration with a radial cap port 38. By bringing the ports 37, 38 into registration lubricant may be introduced into the chamber within said cap at the end of shaft 31 for lubricating the main gear bearing, in addition to which said sleeve may be provided with another port 39 through which some lubricant may flow to the other gears and mechanism of the casing. Gear 30 meshes with and drives the spool shaft pinion 20 and also meshes with and drives a pinion 40 having a square or other non-circular opening to receive a square or other non-circular portion 41 of a reversely threaded screw shaft 42 journalled at its ends in bushings 43 carried by the end heads 3, 4. Pinion 40 is prevented from endwise movement by a suitable stop or abutment 44 suitably secured to the casing 5, as in Fig. 2. Surrounding the screw shaft is a longitudinally slotted tube 45 on which slides a line level wind carriage 46 having an oscillating dog 47 engaging the threads of the shaft 42 and held in place by a screw 48. Said dog engages the screw shaft through the longitudinal slot 49 in sleeve 45 in the same manner as in my prior patent for fishing reel, granted March 30, 1926, No. 1,579,076.

To guide the line to the spool the level wind carriage is provided with two upwardly extending rods 50 joined at their upper ends by a block 52 having a recess to receive and slide along a rib 53 of one of the pillars 50, as shown in Fig. 7. Below the line guide carriage and slightly inwardly therefrom, the two reel frame heads are connected by a bar 54 of the same form described in my prior patent before referred to, and which bar is removably held in place in any suitable manner, such as by a rotatable washer 55 having recesses 56 and held in place by a screw 57. Not only does said washer normally cover the end of the removable bar 54 but also the edge of said head enters a recess 58 in the sleeve 45 so that both said sleeve and bar are removably secured by said washer. Bar 54 prevents the line from accidentally wrapping around the level wind carriage.

As shown in Figs. 5 and 6, the relatively large diameter of pinion 40 is such that it extends beyond the ordinary limits of an otherwise circular end plate and gear casing, thereby requiring a non-symmetrical contour for one of the frame end plates and casing to completely enclose this pinion. This non-symmetrical contour is secured by a lateral extension of the head end plate in its own plane and similar shaping of the gear casing to correspond therewith. Both the head end plate and gear casing are generally circular on a curve of large radius, while the offset extensions thereof have the outer portions of their perimeter circular on a shorter radius, the remainder of the perimeters being formed on lines tangent to the said large and small circles. Head 4 is provided with an annular male flange 59 entering the opening of the casing 5. Said flange, as shown in dotted lines, Fig. 5, is cut away where it would pass across the space occupied by pinion 40 and instead, is provided with one short curved extension 60 and one long curved extension 61, said flange members or extensions conforming closely to the periphery of pinion 40 and assisting to confine said pinion in place when the level wind shaft is removed for cleaning or repairs. Pinion 40, of course, also is confined at its outer portion by the outward extension or bulge of the casing 5, as shown in Fig. 5.

In this reel the spool, including its sleeve 9 and end heads 10, the end heads 3, 4 and the casing 5, may be made of die castings and thereby may be accurately cast to form without the necessity of turning or other finishing operations, which materially reduces the cost of the reel.

The reel also may be provided with click mechanism such as shown in Figs. 3 and 6. This click mechanism includes a click pinion 62 which is preferably a driving fit on the shaft 11 and which cooperates with a triangular or other polygonal non-symmetrical or lop-sided click pawl 63 carried by a rotatable button 64 journalled in the reel tail plate and having a head or handle on its outer end. One short side edge 65 of the click pawl engages a straight portion of a looped spring 66 provided at its opposite ends with eyes loosely surrounding and rotatable or swivelled on headed studs 67 screwed into the tail plate. Fig. 6 illustrates the click in operative position. When the spool rotates in the clockwise direction in said view, or in other words, when the line is being wound in, the resistance of the click to spool rotation is less than when the spool rotates in the opposite direction. Therefore, the click resists unwinding of the spool with greater effect than when the line is being wound in. By turning the click until one of its longer edges 68 is in engagement with the spring 66 it may be disengaged from the click pinion and rendered ineffective.

The invention is not limited to the particular arrangement shown in Fig. 1 for properly laying the line upon the spool. Any arrangement is suitable in which the line guide carriage is so constructed and the reel parts are so arranged as to insure said carriage having sufficient traveling motion lengthwise of the spool to positively guide and lay the line clear up to the spool heads, no matter what their configuration, whether bell-shaped, straight or flatly conical, up to the full line holding capacity of the spool. Such an arrangement very materially assists in preventing backlash because the line is positively laid, layer upon layer, up to the full spool capacity, whereas in prior constructions the line has never been positively guided and laid up to the spool head, especially as the spool becomes more and more filled, but gaps or open spaces may be left unfilled along the spool heads and as the line piles up it finally runs down into such a gap and is overlaid with other layers, ultimately producing entangling of the line and a resulting backlash.

Figs. 8, 9 and 10 show another form of reel in which the foregoing effect is produced equally with that shown in Fig. 1. In this arrangement, adaptable to ordinary or stock reels, the end heads or plates 3ª, 4ª, are built up on their inner faces by the application of a specially formed ring or annulus 24ª, which may be made of any suitable material, such as steel, or other metal, but is shown in the drawings as made of hard rubber. This annulus extends from the end head 3ª, 4ª, as the case may be, inwardly to a suitable amount sufficient to guard or protect the margin or periphery of the spool head and inevitably cause the line to be guided to the line receiving space between the heads and avoid the line getting beyond the spool heads and becoming wedged or entangled in any manner. While this ring or annulus, when separately attached as shown, may be a mere rib, as shown in Fig. 1, in the form shown in Figs. 8 to 10 it extends radially outwardly to the peripheries or margins of the end heads 3ª, 4ª. Also, each of these attached rings 24ª, is cut out or recessed to form a space or cavity 70 into which the line guide carriage may nest or enter as it reaches the end of its traversing movement, thereby enabling the line guiding wires, prongs or other parts of the carriage to move longitudinally of the reel clear to the margin or periphery of the spoolheads and positively lay the line as before described. Indeed, as shown in Fig. 8, that portion of the annulus 24ª which lies between the line guide carriage and the spool head, forms a guard or guide for the line at each end of the spool and assists in turning it back to start another layer and thereby avoids piling the line up along the spool head.

Figs. 8, 11, and 12 illustrate a modified form of cap nut for securing the operating handle to the shaft to which it is secured and which may be substituted in any form of reel for the cap nut 34 and its connected parts shown in Fig. 1. In this arrangement the operating handle 33 is secured to the sleeve 29 by a nut 34ª screwed upon said sleeve. Said nut has a rounded head provided with a screw driver slot 75, and on opposite sides of said slot has oil ports 76 extending diagonally to the sleeve axis. The head of the nut is covered by a sheet metal cap 77 permanently attached thereto by beading or rolling an annular flange 78 around the cap head, the parts being so formed however, that cap 77 may be rotated on the cap nut. In said cap is a screw driver slot 79.

Fig. 11 shows the parts with the screw driver slots 75, 79 in registering relation enabling the screw driver to be inserted through slot 79 to engage slot 75 for turning the nut 34ª to release or secure the operating handle. By turning the cap 90 degrees, to the position shown in Fig. 12, one end of the slot 79 may be brought over or in registration with an oil port 76, so that lubricant may be introduced into the space within the cap nut for lubricating the inner parts of the reel in the same manner that lubricant is introduced through the ports 37 and 38, Fig. 1. Two oil ports 76 are provided so that oil will flow readily into the oil cavity, thereby avoiding the effect of a closed air pocket in said cavity which would prevent the oil from entering the same, due to the absence of an air vent.

Some advantage is gained by the special arrangement of level wind carriage shown in Figs. 13, 14 and 15. In this arrangement the level wind carriage is made somewhat wider or of greater dimension in the direction of the tube on which it slides so as to have a longer bearing thereon. Also, the body portion of the level wind carriage, marked 80, has an opening to receive the tube 81 surrounding the reversely threaded shaft 82, said opening being larger in diameter than the external diameter of the tube 81, leaving a space 83 between them. Into said space are forced hardened steel bushings 84, which are a press or driving fit and are therefore permanently attached. The tube 81 is made of hard bronze and the bearing sleeves 84 are lapped to a nice sliding fit thereon. The cavity 83 separating the bushings 84 forms a pocket in which a small quantity of lubricant collects and is carried back and forth with the traversing carriage. The extended bearing afforded by the separated bushings 84 prevents any cocking of the carriage on this guiding tube. Of course, this carriage, the spool heads and the flanges on the end frame plates are so arranged that the line will be positively guided and laid upon the spool as in the forms before described.

What I claim is:

1. A fishing reel, comprising a frame including connected end plates and a gear casing, in combination with a rotatable spool, operating gears within said casing, and flange members on the frame extending circumferentially around and thereby confining one of the gears in place.

2. In a fishing reel, the combination with a frame end plate, a gear casing secured thereto, a driven pinion in said casing, a shaft extending through said plate into driving engagement with said pinion and endwise removable therefrom, and flange members on said plate preventing said pinion from moving radially when said shaft is removed.

3. In a fishing reel, the combination with a frame end plate, a gear casing secured thereto, a driven pinion in said casing, a shaft extending through said plate into driving engagement with said pinion and endwise removable therefrom, and flange members on said plate preventing said pinion from moving radially when said shaft is removed, said casing also having an abutment opposite the center of said pinion to prevent endwise movement thereof.

4. A fishing reel, comprising a frame, including an end plate at one end and a hollow gear enclosing member at the other end, in combination with a rotatable spool, operating gears therefor within said enclosing member, and flange means on the frame within said member and lying adjacent the periphery of one of said gears to confine it in place.

5. A fishing reel, comprising connected end plates, each provided on its inner face with an annular flange, a spool rotatable between said plates and having its heads located within and partially covered by said flanges, and a line level winding carriage movable back and forth between said end plates through an overall range of movement greater than the distance between said flanges.

6. A fishing reel, comprising connected end plates, each provided on its inner face with an annular flange, a spool rotatable between said plates and having its heads located within and partially covered by said flanges, and line level wind mechanism cooperating with said spool, said mechanism including a line guiding carriage movable back and forth along the spool between said end plates to an end position in which a part of the carriage extends beyond the flange of an end plate to facilitate laying the line against the spool head.

7. A fishing reel, comprising connected end plates, each provided on its inner face with an annular flange, a spool rotatable between said plates and having its heads located within and partially covered by said flanges, and line level wind mechanism cooperating with said spool, said mechanism including a line guiding carriage movable back and forth along the spool between said end plates to two end positions in each of which part of the carriage extends beyond the flange of the adjacent end plate to facilitate laying the line against both of the spool heads.

8. A fishing reel, comprising a frame including end plates, a spool rotatable between said plates and carrying a click pinion, a polygonal click pawl rotatably mounted in one of said plates and having one of its angular corners engaging said pinion at one side of a line joining the centers of rotation of said pawl and pinion, and a looped spring engaging an edge of said pawl opposite said corner and having both of its end portions loosely swivelled to said plate.

9. A fishing reel, comprising a frame having end plates, a rotatable spool, a stub shaft carried by one of said plates, a driving pinion having a sleeve rotatable on said shaft, a handle for said sleeve, and a cap screw threaded to said sleeve for holding said handle in place and provided with a lubricating port for supplying lubricant to the space within said sleeve, said sleeve also having an inner port for conducting lubricant to other parts.

10. A fishing reel provided with end plates, a gear casing and a spool, said end plates each having within its periphery an integral flange, said flanges extending toward each other longitudinally of the spool axis beyond the edges of the spool heads, at least one of said end plates and said casing also having portions extending radially outwardly beyond their otherwise circular peripheries, and line level winding mechanism having a portion within said outwardly extending casing portion and including a traversing carriage movable back and forth a greater overall distance than the distance between said plate flanges.

11. A fishing reel, comprising a frame having end plates, a spool, a reversely threaded shaft parallel with the spool axis, and a level wind carriage traversing said shaft between said end plates, at least one of said end plates having a recess into which the carriage extends at the end of its traversing movement, thereby maintaining long carriage travel and extended bearing of said carriage upon said shaft.

12. A fishing reel, comprising a frame, a rotatable spool therein having end heads, end frame plates having portions guarding the margins of the spool heads and each provided with a recess, and a line guiding carriage movable into the recesses in said end plates for positively laying the line to the full spool capacity.

13. A fishing reel, comprising a frame having end plates, a rotatable spool therein having end heads, a line guiding carriage movable lengthwise of the spool, and guarding means on said end frame plates lying between the line guiding carriage and the spool heads and within the limits of the overall traversing movement of said carriage at each end of the spool.

14. A fishing reel, comprising a frame, a spool rotatable therein, a level wind carriage, and a support therefor extending along the the front of the spool and along which the the carriage slides, said carriage having spaced bushings surrounding and slidable upon the support with a cavity between said bushings.

15. A fishing reel, comprising a frame, a spool rotatable therein, a reversely threaded level wind shaft, a tubular projecting guard around said shaft, and a level wind carriage actuated by said shaft and having separated bushings sliding on said guard with a cavity between said bushings.

16. A fishing reel, comprising a frame, a rotatable spool therein having end heads, end frame plates having portions guarding the margins of the spool heads, at least one of said plates being provided with a recess, and a line guiding carriage movable into said recess for positively laying the line to the full spool capacity.

17. A fishing reel, comprising a frame having end plates, a spool, and a level wind carriage located within the confines of said end plates and movable back and forth between the same, at least one of said end plates having a recess toward which the carriage moves as it approaches said end plate.

18. A fishing reel, comprising a frame including connected end plates, the major portion of the perimeter of the head end plate being formed as a part of a circle of large radius, and an offset projection on the head end plate formed as a part of a circle of small radius, a spool shaft located near the center of the larger circle, and a line traversing shaft located near the center of the smaller circle, gearing connecting said spool shaft and line traversing shaft, and a gear casing secured to the head end plate and of like shape therewith.

In testimony whereof I hereby affix my signature.

FRANCIS M. CASE.

12. A fishing reel, comprising a frame, a rotatable spool therein having end heads, end frame plates having portions guarding the margins of the spool heads and each provided with a recess, and a line guiding carriage movable into the recesses in said end plates for positively laying the line to the full spool capacity.

13. A fishing reel, comprising a frame having end plates, a rotatable spool therein having end heads, a line guiding carriage movable lengthwise of the spool, and guarding means on said end frame plates lying between the line guiding carriage and the spool heads and within the limits of the overall traversing movement of said carriage at each end of the spool.

14. A fishing reel, comprising a frame, a spool rotatable therein, a level wind carriage, and a support therefor extending along the the front of the spool and along which the the carriage slides, said carriage having spaced bushings surrounding and slidable upon the support with a cavity between said bushings.

15. A fishing reel, comprising a frame, a spool rotatable therein, a reversely threaded level wind shaft, a tubular projecting guard around said shaft, and a level wind carriage actuated by said shaft and having separated bushings sliding on said guard with a cavity between said bushings.

16. A fishing reel, comprising a frame, a rotatable spool therein having end heads, end frame plates having portions guarding the margins of the spool heads, at least one of said plates being provided with a recess, and a line guiding carriage movable into said recess for positively laying the line to the full spool capacity.

17. A fishing reel, comprising a frame having end plates, a spool, and a level wind carriage located within the confines of said end plates and movable back and forth between the same, at least one of said end plates having a recess toward which the carriage moves as it approaches said end plate.

18. A fishing reel, comprising a frame including connected end plates, the major portion of the perimeter of the head end plate being formed as a part of a circle of large radius, and an offset projection on the head end plate formed as a part of a circle of small radius, a spool shaft located near the center of the larger circle, and a line traversing shaft located near the center of the smaller circle, gearing connecting said spool shaft and line traversing shaft, and a gear casing secured to the head end plate and of like shape therewith.

In testimony whereof I hereby affix my signature.

FRANCIS M. CASE.

Certificate of Correction.

Patent No. 1,637,437.      Granted August 2, 1927, to

FRANCIS M. CASE.

It is hereby certified that error appears in the printed specification of the above-numbered patent requiring correction as follows: Page 5, line 28, claim 15, for the word "projecting" read *protecting;* and that the said Letters Patent should be read with this correction therein that the same may conform to the record of the case in the Patent Office.

Signed and sealed this 6th day of September, A. D. 1927.

[SEAL.]

M. J. MOORE,
*A ting Commissioner of Patents.*

DISCLAIMER 1,637,437.—*Francis M. Case.* Cleveland Heights, Ohio. FISHING REEL. Patent dated August 2, 1927. Disclaimer filed September 29, 1939, by the assignee, *The Enterprise Manufacturing Company.*

Hereby enters this disclaimer to claims 11, 16, and 17 of the specification.

[*Official Gazette October 24, 1939.*]

Certificate of Correction.

Patent No. 1,637,437. Granted August 2, 1927, to

FRANCIS M. CASE.

It is hereby certified that error appears in the printed specification of the above-numbered patent requiring correction as follows: Page 5, line 28, claim 15, for the word "projecting" read *protecting;* and that the said Letters Patent should be read with this correction therein that the same may conform to the record of the case in the Patent Office.

Signed and sealed this 6th day of September, A. D. 1927.

[SEAL.]

M. J. MOORE,
*Acting Commissioner of Patents.*

DISCLAIMER 1,637,437.—*Francis M. Case.* Cleveland Heights, Ohio. FISHING REEL. Patent dated August 2, 1927. Disclaimer filed September 29, 1939, by the assignee, *The Enterprise Manufacturing Company.*

Hereby enters this disclaimer to claims 11, 16, and 17 of the specification.

[*Official Gazette October 24, 1939.*]